United States Patent
Ota et al.

(10) Patent No.: US 10,132,406 B2
(45) Date of Patent: Nov. 20, 2018

(54) CONTROLLER FOR AUTOMATIC TRANSMISSION

(71) Applicant: TOYOTA JIDOSHA KABUSHIKI KAISHA, Toyota-shi, Aichi-ken (JP)

(72) Inventors: Keisuke Ota, Toyota (JP); Norihiro Tsukamoto, Toyota (JP); Tomohiro Chimbe, Kariya (JP); Ayumu Sagawa, Toyota (JP); Daiki Fukuda, Okazaki (JP); Yuji Kajiyama, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 15/655,304

(22) Filed: Jul. 20, 2017

(65) Prior Publication Data

US 2018/0031124 A1    Feb. 1, 2018

(30) Foreign Application Priority Data

Jul. 28, 2016    (JP) .................................. 2016-148156

(51) Int. Cl.
| | |
|---|---|
| *F16H 61/06* | (2006.01) |
| *B60W 30/19* | (2012.01) |
| *B60W 10/04* | (2006.01) |
| *F16H 61/686* | (2006.01) |
| *F16H 61/08* | (2006.01) |
| *F16H 59/40* | (2006.01) |
| *F16H 59/46* | (2006.01) |
| *F16H 61/04* | (2006.01) |

(52) U.S. Cl.
CPC .......... *F16H 61/061* (2013.01); *B60W 10/04* (2013.01); *B60W 30/19* (2013.01); *F16H 61/08* (2013.01); *F16H 61/686* (2013.01); *B60W 2710/1016* (2013.01); *F16H 2059/405* (2013.01); *F16H 2059/462* (2013.01); *F16H 2061/0492* (2013.01); *F16H 2061/064* (2013.01); *F16H 2306/42* (2013.01)

(58) Field of Classification Search
CPC ... F16H 61/06; F16H 2061/064; B60W 30/19
See application file for complete search history.

(56) References Cited

U.S. PATENT DOCUMENTS

| | | | |
|---|---|---|---|
| 2015/0120154 A1 | 4/2015 | Masunaga et al. | |
| 2015/0127242 A1* | 5/2015 | Iizuka ..................... | F16H 61/02 701/110 |

FOREIGN PATENT DOCUMENTS

WO    2013/168225 A1    11/2013

* cited by examiner

*Primary Examiner* — Tisha D Lewis
(74) *Attorney, Agent, or Firm* — Oliff PLC (57) ABSTRACT

When an inertia phase has started while torque phase control is being executed, the torque phase control is ended, a target torque capacity of an engaging element in inertia phase control is corrected on the basis of a difference between the target torque capacity of the engaging element at the time when the inertia phase has started and the target torque capacity of the engaging element at the time when the torque phase control has completed (or a difference between the target torque capacity of the engaging element at the time when the inertia phase has started and the target torque capacity of the engaging element, which is set at the time when the inertia phase control has started), and the inertia phase control is started.

2 Claims, 7 Drawing Sheets

|  | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev |  |  | ○ |  |  | ○ |

CONTROLLER FOR AUTOMATIC TRANSMISSION

INCORPORATION BY REFERENCE

The disclosure of Japanese Patent Application No. 2016-148156 filed on Jul. 28, 2016 including the specification, drawings and abstract is incorporated herein by reference in its entirety.

BACKGROUND

1. Technical Field

The disclosure relates to a controller for an automatic transmission.

2. Description of Related Art

A clutch-to-clutch shift is performed in a stepped automatic transmission that establishes a plurality of speed positions by selectively engaging a plurality of frictional engagement elements. International Application Publication No. 2013/168225 describes control over an automatic transmission that performs a clutch-to-clutch shift.

In the control described in the International Application Publication No. 2013/168225, a target, torque capacity of an engaging engagement device in a torque phase and an inertia phase is obtained by using an equation common to the torque phase and the inertia phase on the basis of a target input angular acceleration and target output angular acceleration of a transmission and a target torque capacity of a releasing engagement device and a target output torque, and the target torque capacity of the releasing engagement device is set to a value that continuously varies from the, torque phase to the inertia phase.

SUMMARY

Incidentally, in the control described in the International Application Publication No. 2013/168225, when the inertia phase begins while torque phase control is being executed during power-on upshift, the toque capacity of the engaging engagement device is increased to a target torque capacity through the torque phase control. For this reason, an actual torque capacity can be excessive, and jump-out feeling or a shift shock can be experienced.

The disclosure provides a controller for an automatic transmission, which are able to suppress a jump-out feeling or a shift shock even when an inertia phase begins while torque phase control is being executed during power-on upshift.

A first aspect of the disclosure provides a controller for a stepped automatic transmission. The stepped automatic transmission is configured to establish a plurality of speed positions by selectively engaging a plurality of frictional engagement elements. The controller is configured to execute shift control by controlling torque capacities of the frictional engagement elements based on corresponding target torque capacities at the time of a power-on upshift. The controller includes an electronic control unit. The electronic control unit is configured to execute torque phase control for controlling torque capacities of the frictional engagement elements in accordance with a target torque phase progress degree. The electronic control unit is configured to start inertia phase control as the torque phase control completes. The electronic control unit is configured to, when an inertia phase has started while the torque phase control is being executed, end the torque phase control, correct the target torque capacity of an engaging frictional engagement element the inertia phase control on the basis of a difference between the target torque capacity of the engaging frictional engagement element at the time when the inertia phase has started and the target torque capacity of the engaging frictional engagement element at the time when the torque phase control completes or a difference between the target torque capacity of the engaging frictional engagement element at the time when the inertia phase has started and the target torque capacity of the engaging frictional engagement element, which is set at the time when the inertia phase control starts, and start the inertia phase control.

In the aspect of the disclosure "the torque phase control completes" means the time when the target torque phase progress degree has reached 100%, "The torque phase control is ended" means that the torque phase control is ended before completion of the torque phase control.

According to the aspect of the disclosure, when the inertia phase has started while the torque phase control is being executed, the torque phase control is ended, the target torque capacity of the engaging frictional engagement element in the inertia phase control is corrected on the basis of a difference between the target torque capacity of the engaging frictional engagement element at the time when the inertia phase has started and the target torque capacity of the engaging frictional engagement element at the time when the torque phase control completes or a difference between the target torque capacity of the engaging frictional engagement element at the time when the inertia phase has started and the target torque capacity of the engaging frictional engagement element, which is set at the time when the inertia phase control starts, and the inertia phase control is started. With this control, even when the inertia phase has started while the torque phase control is being executed at the time of a power-on upshift, it is possible to shift from the torque phase control to the inertia phase control without an excessive increase in the target torque capacity of the engaging frictional engagement element. Thus, it is possible to suppress a jump-out feeling or a shift shock.

In the aspect of the disclosure, the electronic control unit may be configured to reduce a correction amount in accordance with at least one of an elapsed time from when the inertia phase has started and a decrease in input torque of the automatic transmission, and the correction amount may be used to correct the target torque capacity of the engaging frictional engagement element in the inertia phase control. By setting the correction amount in this way, it is possible to further appropriately control the torque capacities during the inertia phase control, so it is possible to stably execute the inertia phase control.

According to the aspects of the disclosure, even when the inertia phase has started while the torque phase control is being executed at the time of a power-on upshift, it is possible to shift from the torque phase control to the inertia phase control without an excessive increase in the target torque capacity, so it is possible to suppress a jump-out feeling or a shift shock.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings.

Initially, a vehicle 100 according to the present embodiment will be described with reference to FIG. 1 to FIG. 4.

Figure 1:
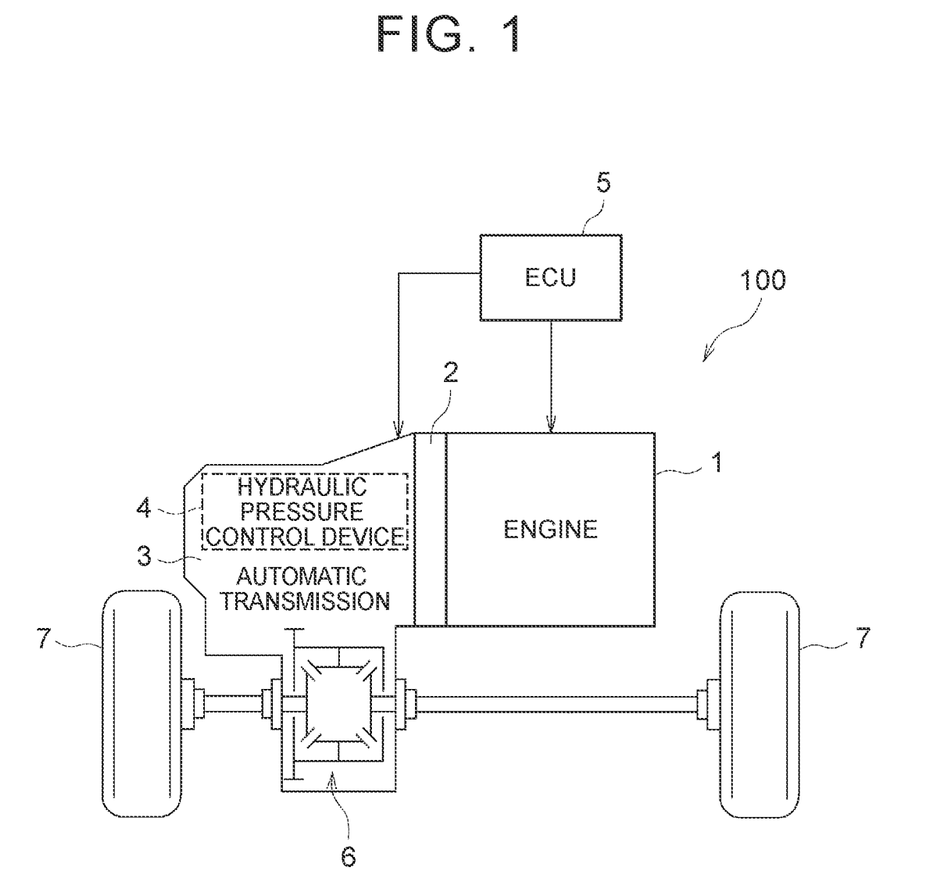
FIG. 1 is a view that shows the schematic configuration of a vehicle on which an automatic transmission to which the disclosure is applied is mounted.

As shown in FIG. 1, the vehicle 100 includes an engine 1, a torque converter 2, an automatic transmission 3, a hydraulic pressure control device 4 and an ECU (an electronic control unit) 5. The vehicle 100 is of, for example, a front-engine front-drive (FF) type. The output of the engine 1 is transmitted to a differential unit 6 via the torque converter 2 and the automatic transmission 3, and is then distributed to right and left drive wheels (front wheels) 7.

The engine (internal combustion engine) 1 is a driving force source for propelling the vehicle 100, and is, for example, a multi-cylinder gasoline engine. The engine 1 is configured such that the operation status is controllable through a throttle opening degree (intake air amount) of a throttle valve, a fuel injection amount, ignition timing, and the like.

Figure 2:
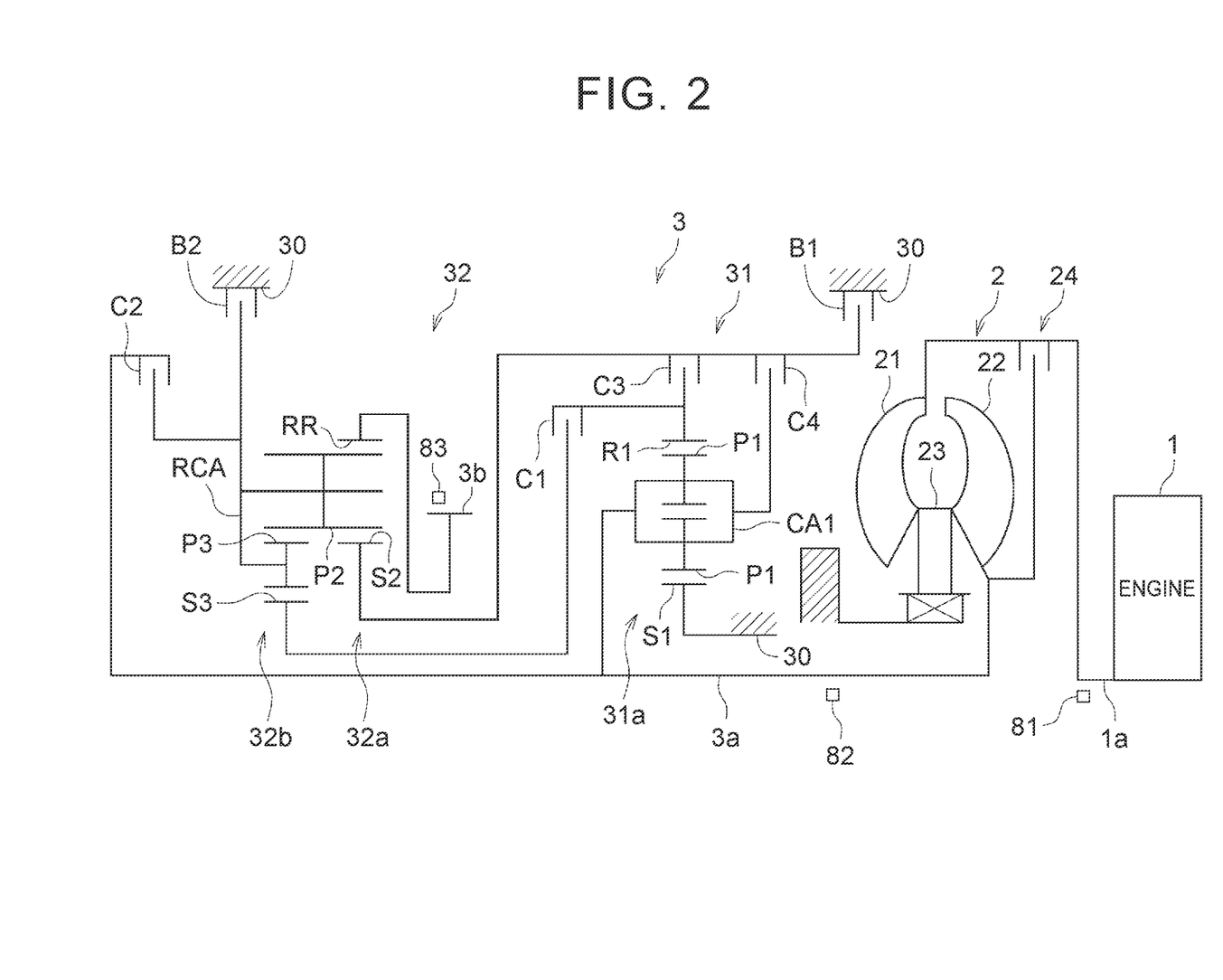
FIG. 2 is a skeletal view that shows the configuration of a torque converter and automatic transmission.

As shown in FIG. 2, the torque converter 2 includes a pump impeller 21, a turbine runner 22, a stator 23 and a lockup clutch 24. The pump impeller 21 is coupled to a crankshaft 1a that is the output shaft of the engine 1. The turbine runner 22 is coupled to the automatic transmission 3. The stator 23 has a torque amplification function. The lockup clutch 24 is used to directly couple the engine 1 to the automatic transmission 3. FIG. 2 schematically shows only the upper half of the torque converter 2 and automatic transmission 3 and does not show the lower half of the torque converter 2 and automatic transmission 3 with respect to the rotation central axes of the torque converter 2 and automatic transmission 3.

The automatic transmission 3 is provided in the power transmission path between the engine 1 and the drive wheels 7. The automatic transmission 3 is configured to change the speed of rotation of an input shaft 3a and then output the rotation to an output shaft 3b. The input shaft 3a of the automatic transmission 3 is coupled to the turbine runner 22 of the torque converter 2. The output shaft 3b of the automatic transmission 3 is coupled to the drive wheels 7 via the differential unit 6, and the like.

The automatic transmission 3 includes a first transmission unit (front planetary unit) 31, a second transmission unit (rear planetary unit) 32, first to fourth clutches C1 to C4, a first brake B1, a second brake B2, and the like. The first transmission unit 31 is mainly constituted of a first planetary gear 31a. The second transmission unit 32 is mainly constituted of a second planetary gear 32a and a third planetary gear 32b.

The first planetary gear 31a that constitutes the first transmission unit 31 is a double pinion planetary gear set. The first planetary gear 31a includes a sun gear S1, a plurality of pairs of mutually meshing pinion gears P1, a planetary carrier CA1 and a ring gear R1. The planetary carrier CA1 supports the pinion gears P1 such that each of the pinion gears P1 is rotatable and revolvable. The ring gear R1 is in mesh with the sun gear S1 via the pinion gears P1.

The planetary carrier CA1 is coupled to the input shaft 3a, and rotates integrally with the input shaft 3a. The sun gear S1 is fixed to a transmission case 30, and is non-rotatable. The ring gear R1 functions as an intermediate output member. The ring gear R1 reduces the speed of rotation from the input shaft 3a and then transmits the rotation reduced in speed to the second transmission unit 32.

The second planetary gear 32a that constitutes the second transmission. unit 32 is a single pinion planetary gear set. The second planetary gear 32a includes a sun gear S2, pinion gears P2, a planetary carrier RCA and a ring gear RR. The planetary carrier RCA supports the pinion gears P2 such that each of the pinion gears P2 is rotatable and revolvable. The ring gear RR is in mesh with the sun gear S2 via the pinion gears P2.

The third planetary gear 32b that constitutes the second transmission unit 32 is a double pinion planetary gear set. The third planetary gear 32b includes a sun gear S3, a plurality of pairs of mutually meshing pinion gears P2, P3, the planetary carrier RCA and the ring gear RR. The planetary carrier RCA supports the pinion gears P2, P3 such. that each of the pinion gears P2, P3 is rotatable and revolvable. The ring gear RR is in mesh with the sun gear S3 via the pinion gears P2. P3. The planetary carrier RCA and the ring gear RR are shared between the second planetary gear 32a and the third planetary gear 32b.

The sun gear S2 is selectively coupled to the transmission case 30 by the first brake B1. The sun gear S2 is selectively coupled to the ring gear R1 via the third clutch C3. The sun gear S2 is selectively coupled to the planetary carrier CA1 via the fourth clutch C4. The sun gear S3 is selectively coupled to the ring gear R1 via the first clutch C1. The planetary carrier RCA is selectively coupled to the transmission case 30 by the second brake B2. The planetary carrier RCA is selectively coupled to the input shaft 3a via the second clutch C2. The ring gear RR is coupled to the output shaft 3b, and rotates integrally with the output shaft 3b.

Each of the first to fourth clutches C1 to C4, the first brake B1 and the second brake B2 is a frictional engagement element that is frictionally engaged by a hydraulic actuator, and is controlled by the hydraulic pressure control device 4 and the ECU 5.

Figure 3:
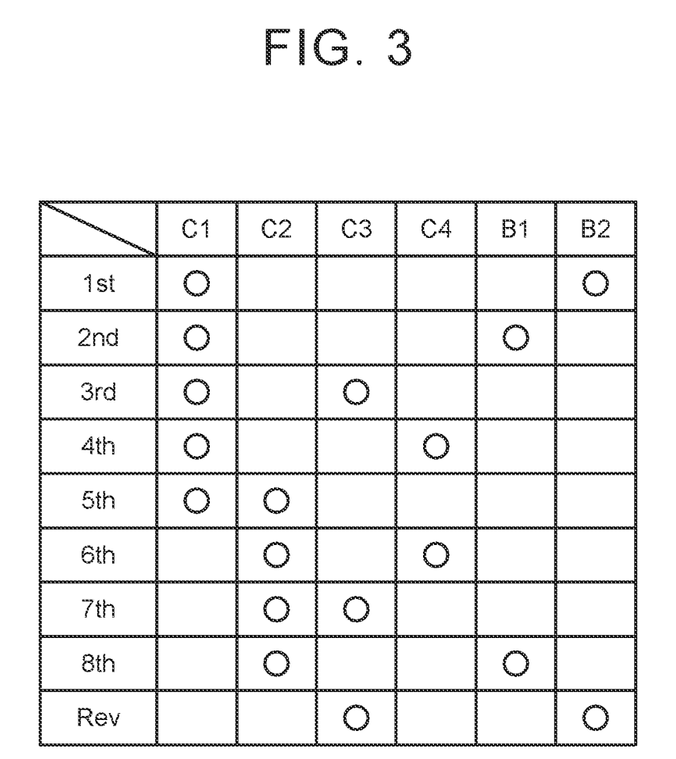
FIG. 3 is an operation chart that shows the engagement statuses of first to fourth clutches and first and second brakes in each speed position in the automatic transmission.

FIG. 3 is an operation chart that shows the engaged state or released state of each of the first to fourth clutches C1 to C4, first brake B1 and second brake B2 in each speed position (gear position). In the operation chart of FIG. 3, the circle mark indicates "engaged state, and the blank indicates "released state".

As shown in FIG. 3, in the automatic transmission 3 of this example, when the first clutch C1 and the second brake B2 are engaged, a first speed position (1st) is established. In the first speed position, a speed ratio (Rotation speed of the input shaft 3a/Rotation speed of the output shaft 3b) the largest. When the first clutch C1 and the first brake B1 are engaged, a second speed position (2nd) is established.

When the first clutch C1 and the third clutch C3 are engaged, a third speed position (3rd) is established. When the first clutch C1 and the fourth clutch C4 are engaged, a fourth speed position (4th) is established, When the first clutch C1 and the second clutch C2 are engaged, a fifth speed position (5th) is established. When the second clutch C2 and the fourth clutch C4 are engaged, a sixth speed position (6th) is established.

When the second clutch C2 and the third clutch C3 are engaged, a seventh speed position (7th) is established. When the second clutch C2 and the first brake B1 are engaged, an eighth speed position (8th) is established. When the third clutch C3 and the second brake B2 are engaged, a reverse position (Rev) is established.

In the present embodiment, the forward speed positions (1st to 8th) are established through clutch-to-clutch shift.

The hydraulic pressure control device 4 controls each of the plurality of frictional engagement elements (the clutches C1 to C4 and the brakes B1, B2) of the automatic transmission 3 such that each frictional engagement element is engaged or released. The hydraulic pressure control device 4 has the unction of controlling the lockup clutch 24 of the torque converter 2. The hydraulic pressure control device 4 includes hydraulic actuators of the frictional engagement elements of the automatic transmission 3, linear solenoid valves, and the like. The linear solenoid valves respectively supply control hydraulic pressures to the corresponding hydraulic actuators.

Figure 4:
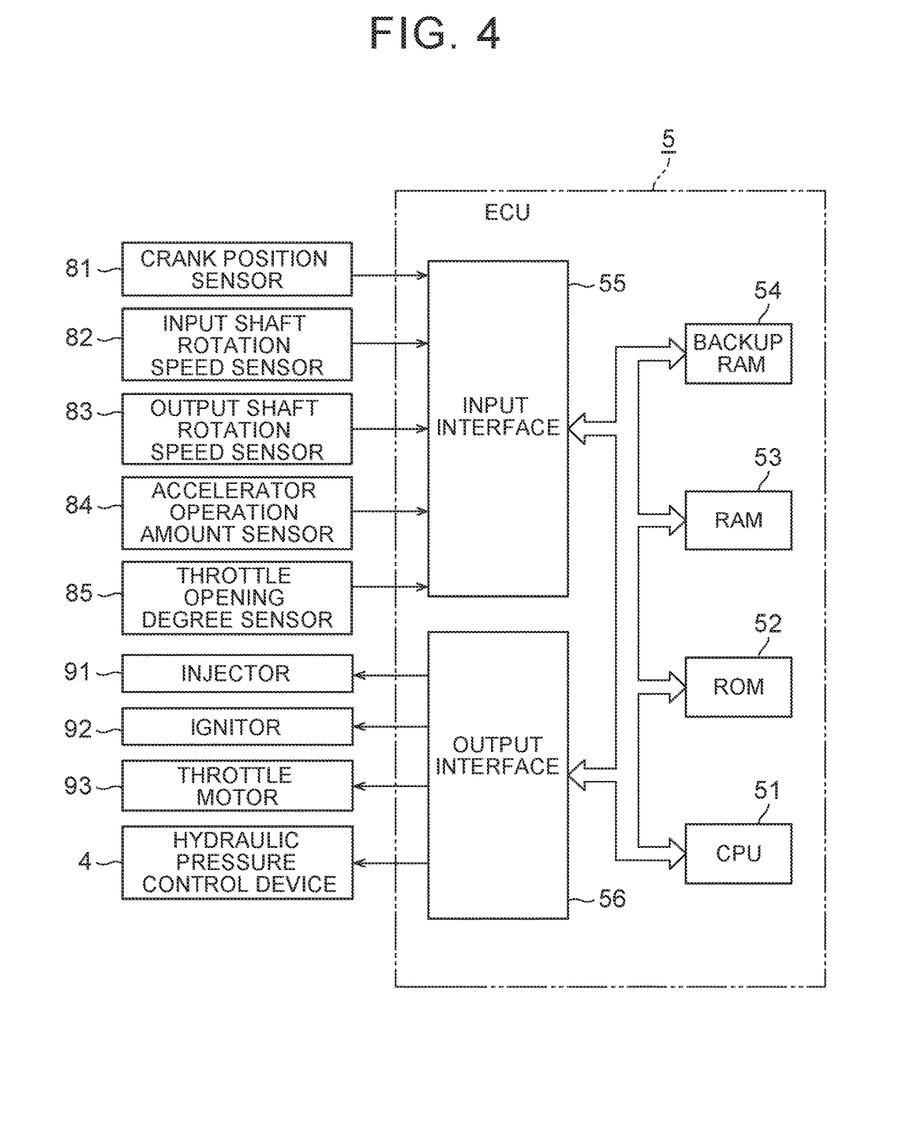
FIG. 4 is a block diagram that shows the configuration of a control system of the vehicle.

The ECU 5 is configured to control the operation of the engine 1, the shift of the automatic transmission 3, and the like. Specifically, as shown in FIG. 4, the ECU 5 includes a CPU 51, a ROM 52, a RAM 53, a backup RAM 54, an input interface 55 and an output interface 56. The ECU 5 is an example of an electronic control unit according the aspects of the disclosure.

The CPU 51 executes arithmetic processing on the basis of various control programs and maps stored in the ROM 52. The ROM 52 stores various control programs, maps, and the like. The maps are referenced when those various control programs are executed. The RAM 53 is a memory that temporarily stores computed results of the CPU 51, detected results of sensors, and the like. The backup RAM 54 is a nonvolatile memory that stores data, and the like, to be saved at the time when the ignition is turned off.

A crank position sensor 81, an input shaft rotation speed sensor 82, an output shaft rotation speed sensor 83, an accelerator operation amount sensor 84, a throttle opening degree sensor 85, and the like, are connected to the input interface 55.

The crank position sensor 81 is provided in order to calculate the rotation speed of the engine 1. The input shaft rotation speed sensor 82 is provided in order to calculate the rotation speed of the input shaft 3a (turbine rotation speed) of the automatic transmission 3. The output shaft rotation speed sensor 83 is provided in order to calculate the rotation speed of the output shaft 3b of the automatic transmission 3. It is possible to calculate a vehicle speed V on the basis of the rotation speed of the output shaft 3b The accelerator operation amount sensor 84 is provided in order to detect an accelerator operation amount that is the depression amount (operation amount) of an accelerator pedal. The throttle opening degree sensor 85 is provided in order to detect the throttle opening degree of the throttle valve.

An injector 91 an ignitor 92, a throttle motor 93, the hydraulic pressure control device 4, and the like, are connected to the output interface 56. The injector 91 is a fuel injection valve, and is able to regulate the fuel injection amount. The ignitor 92 is provided in order to regulate the ignition timing of an ignition plug. The throttle motor 93 is provided in order to regulate the throttle opening degree of the throttle valve.

The ECU 5 is configured to be able to control the operation status of the engine 1 by controlling the throttle opening degree, the fuel injection amount, the ignition tinting, and the like, on the basis of detected results of the sensors, and the like. The ECU 5 is configured to be able to control the shift of the automatic transmission 3 and control the lockup clutch 24 of the torque converter 2 by controlling the hydraulic pressure control device 4.

In the shift control by the ECU 5, for example, a required speed position is set on the basis of a shift map that uses a vehicle speed and an accelerator operation amount as parameters, and the hydraulic pressure control device 4 is controlled such that an actual speed position becomes the required speed position. The shift map is a map in which a plurality of regions for obtaining appropriate speed positions (speed positions 1st to 8th that achieve optimal efficiency) are set in response to a vehicle speed and an accelerator operation amount, and is stored in the ROM 52 of the ECU 5. A plurality of shift lines for defining the regions (upshift lines and downshift lines for defining the shift regions of 1st to 8th) are set in the shift map.

The ECU 5 executes power-on upshift control torque phase control and inertia phase control) (described later).

Before characterized control (power-on upshift control) of the present embodiment is described, the outline of shift control for determining controlled operation amounts that achieve shift target values in the automatic transmission 3 will he described.

The present embodiment employs a technique for performing a shift with the use of a shift model that determines controlled operation amounts for achieving shift target values as shift control. The shift target values are target values of factors (such as a shift time and a driving force) that determine an intended mode of change during shifting. The controlled operation amounts are required values of factors (such as an engine torque and a clutch torque) that are operated for controlled objects.

Hereinafter, shift control that uses a shift model will be described. The equation of motion during shifting is expressed by the following mathematical expressions (1) and (2).

$$d\omega t/dt = a1 \cdot Tt + b1 \cdot Tcapl + c1 \cdot Tcdrn + d1 \cdot d\omega o/dt \quad (1)$$

$$To = a2 \cdot Tt + b2 \cdot Tcapl + c2 \cdot Tcdrn + d2 \cdot d\omega o/dt \quad (2)$$

These mathematical expressions (1) and (2) are derived from the equation of motion of each of mutually coupled rotating elements that constitute the automatic transmission 3 and a relational expression in each of the planetary gears that constitute the automatic transmission 3. The equation of motion of each of the rotating elements is such an equation of motion that a torque that is expressed by a product of an inertia in each of the rotating elements and a time rate of change in rotation speed is defined as a torque that acts on a member associated with each of the rotating elements among the three members of each of the planetary gears and members at both sides of each of the frictional engagement elements. The relational expression in each of the planetary gears is such a relational expression that a relation in torque among the three members of each of the planetary gears and a relation in the time rate of change in rotation speed each are defined by using the gear ratio of a corresponding one of the planetary gears.

In the mathematical expressions (1) and (2), $d\omega t/dt$ is a time derivative, that is, time rate of change, of a turbine rotation speed (rotational angular velocity) $\omega t$ (that is, the input shaft rotation speed $\omega i$ of the automatic transmission 3), and denotes the acceleration (angular acceleration; hereinafter, referred to as input shaft acceleration) of the input shaft 3a as the amount of change in the speed of the input shaft 3a-side rotating member. $d\omega o/dt$ is a time rate of change in the output shaft rotation speed $\omega o$ of the automatic transmission 3, and denotes an output shaft acceleration. Tt denotes a turbine torque, that is, a transmission input torque (hereinafter, also referred to as input torque) Ti, which is the torque of the input shaft 3a as the torque of the input shaft 3a-side rotating member. When a torque ratio t of the torque converter 2 is considered, the turbine torque Tt is synonymous with an engine torque Te(=Tt/t). To denotes a transmission output torque (hereinafter, also referred to as output torque) that is the torque of the output shaft 3b as the torque of an output shaft 3b-side rotating member. Tcapl is the torque capacity (hereinafter, also referred to as engaging clutch torque capacity) of the frictional engagement element that performs engaging operation during shifting, Tcdrn is the torque capacity (hereinafter, also referred to as releasing clutch torque capacity) of the frictional engagement element that performs releasing operation during shifting.

a1, a2, b1, b2, c1, c2, d1, d2 each are a constant at the time when the mathematical expressions (1) and (2) are derived, and are coefficients that are determined by design on the basis of an inertia in each of the rotating elements and the gear ratio of each of the planetary gears. Specific numeric values of these constants depend on, for example, each of types of shift (for example, a shift pattern and a combination of a speed position before shifting and a shift position after shifting). Therefore, although the equation of motion is one predetermined equation of motion, the equation of motion corresponding to each of the types of shift, in which constants vary depending on each of the types of shift, is used to shift the automatic transmission 3.

The mathematical expressions (1) and (2) are the equation of motion of the gear train (hereinafter, referred to as the equation of motion) of the automatic transmission 3, and formulate the relation between shift target values and controlled operation amounts. Shift target values are allowed to represent a target value of a shift time and a target value of a driving force, and are allowed to be used in the equation of motion.

On the other hand, in the present embodiment, three values, that is, the turbine torque Tt (which is synonymous with the engine torque Te), the engaging clutch torque capacity Tcapl and the releasing clutch torque capacity Tcdrn, are set as the controlled operation amounts of control (feedback control) for establishing the shift target values. Since there are three controlled operation amounts for the fact that the equation of motion is composed of two mathematical expressions, that is, the mathematical expressions (1) and (2) it is not possible to uniquely determine the controlled operation amounts for achieving the two shift target values.

In the present embodiment, torque shares of transmission torque shared between a releasing clutch and an engaging clutch are used as a constraint for obtaining solutions to the equation of motion composed of the mathematical expressions (1) and (2). By using the torque shares as a constraint, it is possible to allow an exchange of torque between the releasing clutch and the engaging clutch (that is, the degree of progress of shift) during shifting to be incorporated into the equation of motion and to uniquely solve the controlled operation amounts.

The torque shares are the proportions of transmission torque shared between the releasing clutch and the engaging clutch during shifting of the automatic transmission 3 with respect to the torque of the input shaft 3a (input shaft total transmission torque) when the total of transmission torque (total transmission torque) that needs to be shared between both the frictional engagement elements is converted to the input shaft total transmission torque. The torque shares are varied in response to the degree of progress of shift during shifting.

In the present embodiment, where the torque share of the engaging clutch is denoted by xapl and the torque share of the releasing clutch is denoted by xdrn, the torque shares are respectively defined by the following mathematical expression (3) and (4) by using a torque share x (for example, $1 \leq x \leq 1$) that varies in time sequence so as to reflect aid exchange of torque during shifting.

$$xapl=x \quad (3)$$

$$xdrn=1-x \quad (4)$$

The relational expression between the engaging clutch torque capacity Tcapl and the releasing clutch torque capacity Tbdrn may he defined by using "x" (=xapl) and "1−x" (=xdrn) on the basis of Tcapl and Tcdrn, which are converted as torques of the input shaft 3a, and the mathematical expressions (3) and (4). From the mathematical expressions (1) and (2) and the relational expression between Tcapl and Tcdrn, relational expressions for calculating the turbine torque Tt, the engaging clutch torque capacity Tcapl and the releasing clutch torque capacity Tcdrn that are controlled operation amounts are derived. The turbine torque Tt (which is synonymous with the engine torque Te) is expressed by a relational expression that uses "x" (=xapl), "1−x" (=xdrn), the input shaft acceleration $d\omega t/dt$, the transmission output torque To, and the like. Similarly the engaging clutch torque capacity Tcapl is expressed by a relational expression that uses "x" (=xapl), the input shaft acceleration $d\omega t/dt$, the transmission output torque To, and the like. Similarly, the releasing clutch torque capacity Tcdrn is expressed by a relational expression that uses "1−x" (=xdrn), the input shaft acceleration $d\omega t/dt$, the transmission output torque To, and the like.

That is, the shift model according to the present embodiment is to calculate the controlled operation amounts on the basis of the shift target values by using the equation of motion (the above-described mathematical expressions (1) and (2) of the automatic transmission 3, including the shift target values and the controlled operation amounts, and the relations (the above-described mathematical expressions (3) and (4)) that respectively express the torque shares. In this way, in the present embodiment, by adding the constraint set by the torque share x to the mathematical expressions (1) and (2), the shift of the automatic transmission 3 is performed with the use of the shift model. Thus, even when there are three controlled operation amounts for two shift target values, it is possible to appropriately determine the three controlled operation amounts with the use of the shift model.

The shift model is a predetermined one, and the equation of motion of the gear train having different constants for each of the types of shift (for example, a shift pattern and a combination of a speed position before shifting and a speed position after shifting) as described above is used, so the shift model corresponding to each of the types of shift is used to shift the automatic transmission 3.

The ECU 5 calculates shift target values and controlled operation amounts on the basis of the degree of progress of shift for each shift pattern. The shift patterns are, for example, a power-on upshift, a power-off upshift, a power-on downshift and a power-off downshift.

For example, in the case of a power-on upshift, when hydraulic pressure control is started over the frictional engagement elements commensurate with a target speed position, the shift initially enters the stage of a torque phase in which the shares of a required torque capacity (target clutch torque capacity) between the frictional engagement elements vary, and then passes through the stage of an inertia phase in which the speed ratio of the automatic transmission 3 varies, after which the shift ends. That is, the shift of the automatic transmission 3 proceeds in order of the stage before the torque phase, the stage of the torque phase, the stage of the inertia phase and the stage at the end of the shift.

A map, or the like, in which suitable torque shares that vary as the shift proceeds are set on the basis of the degree of progress of shift for each shift pattern is prepared in advance by experiment, simulation, or the like, and is stored in the ROM 52 of the ECU 5.

The ECU 5 reads the torque shares based on the degree of progress of shift at the time of shift control, applies the torque shares to the shift model together with the shift target values, and calculates a required input torque of the input shaft 3a (target input shaft torque), an engaging target clutch torque capacity and a releasing target clutch torque capacity, which are the controlled operation amounts.

The ECU 5 controls the clutch torque capacity of the engaging clutch (the torque capacity of the engaging frictional engagement element) and the clutch torque capacity of the releasing clutch (the torque capacity of the releasing frictional engagement element) in response to a target torque phase progress degree (the degree of progress of a target torque phase) on the basis of the calculated engaging target clutch torque capacity and releasing target clutch torque capacity. This control corresponds to torque phase control according to the aspects of the disclosure. The progress of the target torque phase is controlled on the basis of a target output torque, a target torque phase time (a time during which the output torque is changed), the torque shares, and the like. The ECU 5 executes inertia phase control after the end of the torque phase control. In the inertia phase control as well, the ECU 5 controls the clutch torque capacity of the engaging clutch and the clutch torque capacity of the releasing clutch in response to the degree of progress of shift on the basis of the engaging target clutch torque capacity and the releasing target clutch torque capacity.

Next, the power-on upshift control that is executed by the ECU 5 will be described.

Initially, existing power-on upshift control (hereinafter, referred to as existing control) will be described with reference to FIG. 7.

Figure 7:
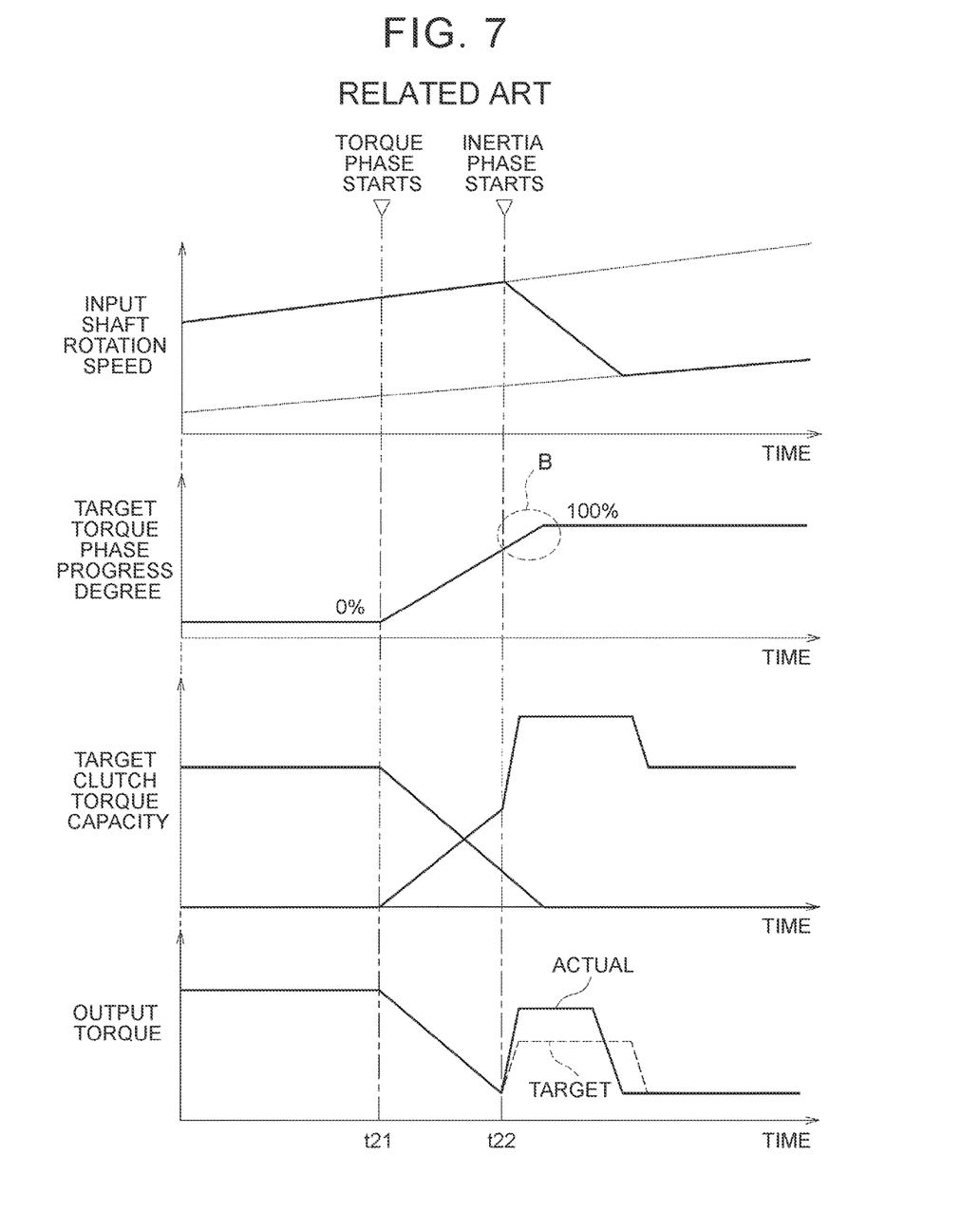
FIG. 7 is a timing chart that shows an example of existing power-on upshift control.

FIG. 7 is a timing chart that shows changes in target clutch torque capacity during power-on upshift. In this existing control, after it is determined to perform a power-on upshift, the releasing target clutch torque capacity begins to decrease at time t21. The engaging target clutch torque capacity begins to increase accordingly. That is, the torque phase starts.

In this way, the releasing target clutch torque capacity decreases, and the engaging target clutch torque capacity increases. Then, when torque that is transmitted through the path for which a speed position after shifting is set increases to some extent, the inertia phase starts (time t22).

Although the inertia phase can start due to a deviation between the target clutch torque capacity and an actual clutch torque capacity; or the like, while the torque phase control is being executed (before the target torque phase progress degree reaches 100%), the torque phase control is continued until the torque phase control completes (until the target torque phase progress degree reaches 100%) even when the inertia phase starts in the existing control (see portion B in FIG. 7). For this reason, even when the inertia phase is started, the torque capacity of the engaging clutch is increased to the target clutch torque capacity because of continuation of the torque phase control. Thus, the actual torque capacity of the engaging clutch becomes excessive, and the actual output torque is larger than the target output torque (the dashed line in FIG. 7), so a jump-out feeling or a shift shock can be experienced.

The present embodiment is made in consideration of the above-described inconvenience, and implements control for making it possible to suppress a jump-out feeling and a shift shock even when the inertia phase is started while the torque phase control is being executed at the time of a power-on upshift.

An example of the control (power-on upshift control) will he described with reference to the flowchart of FIG. 5. The control routine of FIG. 5 is repeatedly executed by the ECU 5 at predetermined time intervals.

Figure 5:
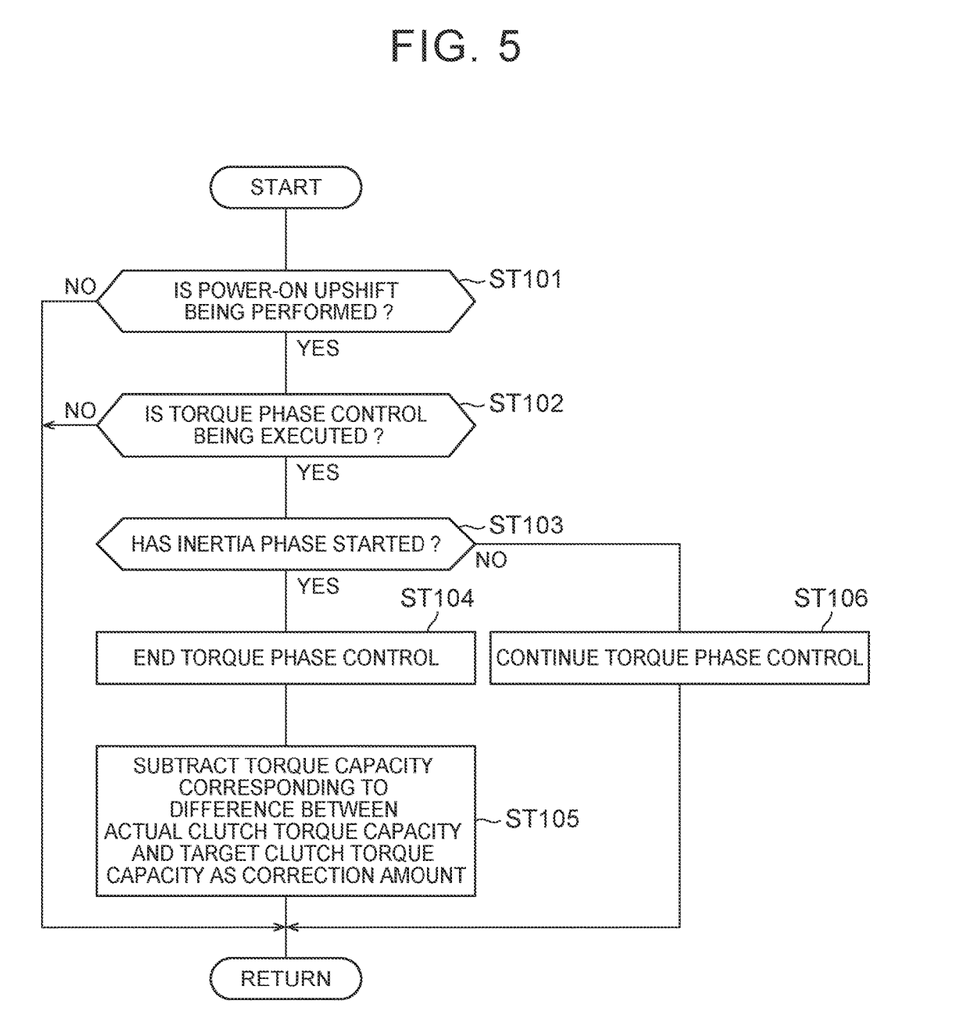
FIG. 5 is a flowchart that shows an example of power-on upshift control that is executed by an ECU.

As the control routine of FIG. 5 is started, it is initially determined in step ST101 whether there is a request to shift the automatic transmission 3 and the shift is a power-on upshift. When negative determination (NO) is made, the process returns. When affirmative determination (YES) is made in step ST101, the process proceeds to step ST102.

In step ST102, it is determined whether the torque phase control is being executed. When negative determination is made (NO), the process returns. When affirmative determination (YES) is made in step ST102, the process proceeds to step ST103.

In step ST103, it is determined whether the inertia phase has started. In determining whether the inertia phase has started, the start of the inertia phase is determined at the time when the input shaft rotation speed that is obtained from the output signal of the input shaft rotation speed sensor 82 begins to decrease toward the synchronous rotation speed after shifting.

When negative determination (NO) is made in step ST103 (when the inertia phase has not started), the torque phase control is continued (step ST106).

On the other hand, when affirmative determination (YES) is made in step ST103, that is, when the inertia phase has started, it is determined that the torque phase control has completed, and the torque phase control is ended (step ST104). The target torque phase progress degree is set to 100% at this point in time (at the time when the torque phase control is ended) (see portion A in FIG. 6).

In step ST105, a torque capacity corresponding to the difference between an actual clutch torque capacity (a clutch torque capacity at the time when the inertia phase has actually started) and the target clutch torque capacity is used as a correction amount, and the correction amount is subtracted from the engaging target clutch torque capacity. This correction process will be described below.

Initially, when the torque phase control is ended and the inertia phase control is started in the case where the inertia phase has started while the torque phase control is being executed, if the engaging target clutch torque capacity in the above-described equation of motion is instantaneously varied at the end of the torque phase (at the start of the inertia phase), the actual engaging clutch torque steeply increases.

Figure 6:
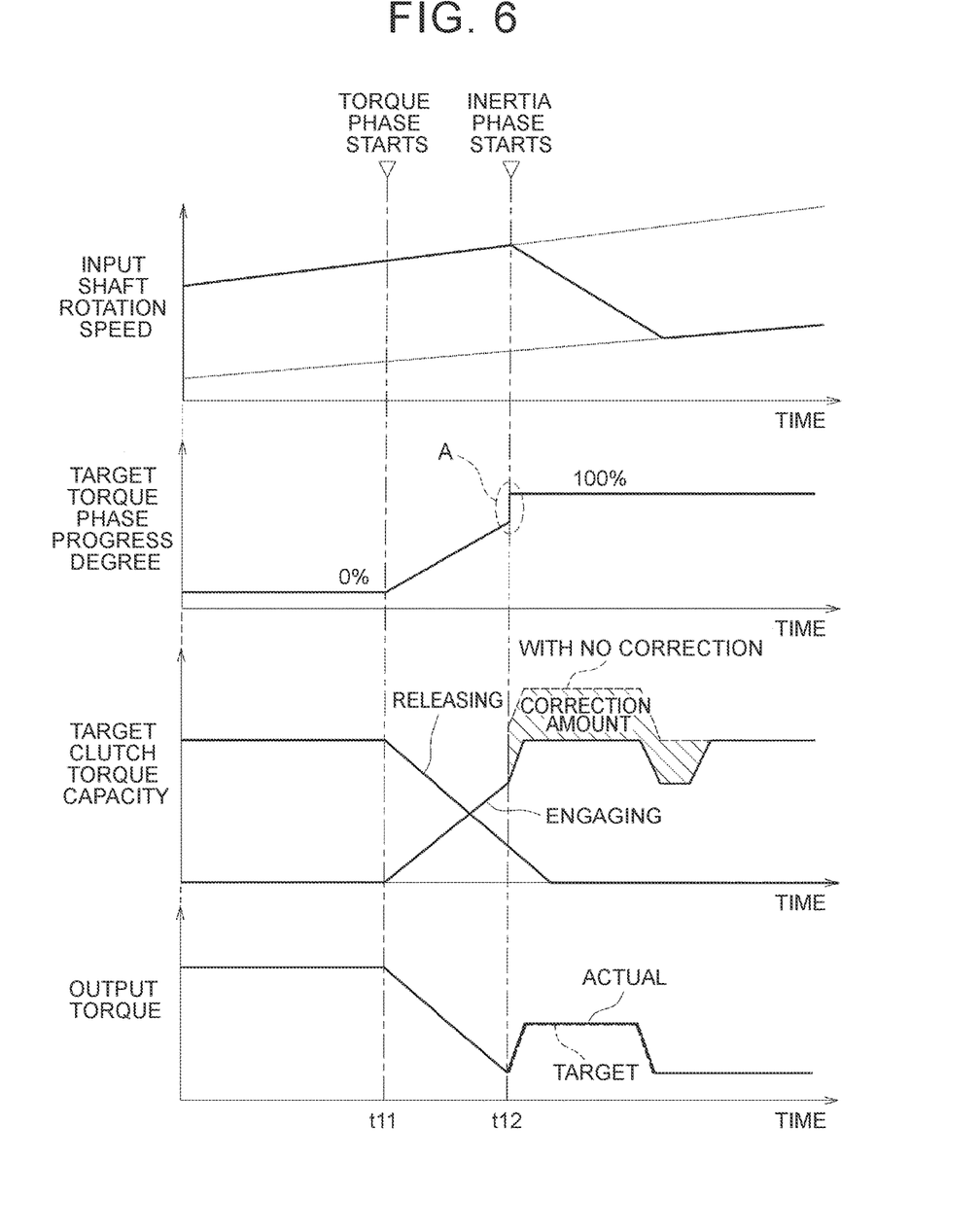
FIG. 6 is a timing chart that shows an example of the power-on upshift control that is executed by the ECU.

In consideration of such a point, in the present embodiment, the difference (absolute value) between the engaging target clutch torque capacity at the time when the inertia phase has started (for example, when the target torque phase progress degree is 80% at the start of the inertia phase, the engaging target clutch torque capacity at the time when the target torque phase progress degree is 80%) and the engaging target clutch torque capacity at the completion of the torque phase control (the engaging, target clutch torque capacity in the case where the target torque phase progress degree has reached 100%) is used as a correction amount, and the correction amount is subtracted from the engaging target clutch torque capacity in the inertia phase control (see the hatched portion in FIG. 6).

With this correction process, the engaging target clutch torque capacity does not steeply increase at the time of shifting from the torque phase control to the inertia phase control. Moreover, it is possible to execute subsequent shift control (inertia phase control) while the engaging target clutch torque capacity at the start of the inertia phase (time t12 in FIG. 6) is set to the clutch torque capacity at the completion of the torque phase control.

As for the correction amount that is subtracted from the engaging target clutch torque capacity, the difference (absolute value) between the engaging target clutch torque capacity at the start of the inertia phase control and the engaging target clutch torque capacity that is set at the start of the inertia phase control may be set for the correction amount.

The correction amount for the engaging target clutch torque capacity of the inertia phase control may be set so as to reduce with an elapsed time from the start of the inertia phase or may be set so as to reduce with a decrease in input torque. The correction amount may be set so as to reduce with an elapsed time from the start of the inertia phase and a decrease in input torque.

In this way, when the correction amount for correcting the engaging target clutch torque capacity in the inertia phase control is set so as to reduce with an elapsed time from the start of the inertia phase or a decrease in input torque, it is possible to further appropriately control the clutch torque capacity of the engaging clutch (frictional engagement element) during the inertia phase control, so it is possible to stably execute the inertia phase control.

When step ST101 to step ST106 in FIG. 5 are executed by the ECU 5, a controller for an automatic transmission according to the aspects of the disclosure is implemented.

Next, a specific example of the power-on upshift control will be described with reference to FIG. 6.

FIG. 6 is a timing chart that shows changes in target clutch torque capacity at the time of a power-on upshift. In this control example, after it is determined to perform a power-on upshift (it is determined to shift on the basis of a vehicle speed, an accelerator operation amount and the shift map), the releasing target clutch torque capacity begins to decrease at time t11. The engaging target clutch torque capacity begins to increase accordingly. That is, the torque phase starts.

In this way, the releasing target clutch torque capacity decreases, and the engaging target clutch torque capacity increases. When torque that is transmitted through the path for setting a speed position after shifting increases to some extent, the inertia phase starts. When the inertia phase starts while the torque phase control is being executed (when the inertia phase has started while the target torque phase progress degree has not reached 100%), the target torque phase progress degree is set to 100% and the torque phase control completes at time t12 at which the inertia phase has started (see portion A in FIG. 6).

At time t12 at which the inertia phase has started, for example, the difference (absolute value) between the engaging target clutch torque capacity at the time when the inertia phase has started and the engaging target clutch torque capacity at the time when the torque phase control completes (when the target torque phase progress degree has reached 100%) is used as a correction amount, the correction amount (see the batched portion in FIG. 6) is subtracted from the engaging target clutch torque capacity in the inertia phase control, and then the inertia phase control is started. By correcting the engaging target clutch torque capacity in the inertia phase control in this way, an actual output torque coincides with the target output torque (the dashed line in FIG. 6), so it is possible to suppress a jump-out feeling or a shift shock.

As described above, according to the present embodiment, even when the inertia phase has started while the torque phase control is being executed at the time of a power-on upshift, it is possible to shift from the torque phase control to the inertia phase control without an excessive increase in the engaging target clutch torque capacity. Thus, it is possible to suppress a jump-out feeling or a shift shock.

The embodiment described above is illustrative and not restrictive in all respects. Therefore, the technical scope should not be interpreted from only the above-described embodiment but be defined on the basis of the appended claims. The technical scope encompasses the appended claims, equivalents thereof and all the modifications within the scope of the disclosure.

For example, in the above-described embodiment, an example in which the aspects of the disclosure are applied to control over the forward eight-speed automatic transmission 3 is described; however, the aspects of the disclosure are not limited to the control over the automatic transmission 3. The aspects of the disclosure may also be applied to control over an automatic transmission having forward seven-speed or smaller or forward nine-speed or larger.

In the above-described embodiment, an example in which the vehicle 100 is an FF vehicle. However, the aspects of the disclosure are not limited to this configuration. The vehicle may be a front-engine rear-drive (FR) vehicle or a four-wheel drive vehicle.

In the above-described embodiment, an example in which the engine 1 is a multi-cylinder gasoline engine is described; however, the aspects of the disclosure are not limited to this configuration. The engine may be a diesel engine, or the like.

In the above-described embodiment, the ECU 5 may be formed of a plurality of ECUs.

The aspects of the disclosure are effectively usable for a controller for a stepped automatic transmission that establishes a plurality of speed positions by selectively engaging a plurality of frictional engagement elements.

What is claimed is:

1. A controller for a stepped automatic transmission, the stepped automatic transmission being configured to establish a plurality of speed positions by selectively engaging a plurality of frictional engagement elements, the controller being configured to execute shift control by controlling torque capacities of the frictional engagement elements based on corresponding target torque capacities at the time of a power-on upshift, the controller comprising:
an electronic control unit configured to:

i) execute torque phase control for controlling the torque capacities of the frictional engagement elements in accordance with a target torque phase progress degree, ii) start inertia phase control as the torque phase control completes, iii) when an inertia phase has started while the torque phase control is being executed, end the torque phase control, iv) correct the target torque capacity of an engaging frictional engagement element in the inertia phase control based on a difference between the target torque capacity of the engaging frictional engagement element at the time when the inertia phase has started and the target torque capacity of the engaging frictional engagement element at the time when the torque phase control completes or a difference between the target torque capacity of the engaging frictional engagement element at the time when the inertia phase has started and the target torque capacity of the engaging frictional engagement element, which is set at the time when the inertia phase control starts, and v) start the inertia phase control.

2. The controller according to claim 1, wherein the electronic control unit is configured to reduce a correction amount in accordance with at least one of an elapsed time from when the inertia phase has started and a decrease in input torque of the stepped automatic transmission, and the correction amount is used to correct the target torque capacity of the engaging frictional engagement element in the inertia phase control.

* * * * *